March 29, 1949.  A. H. LAMB  2,465,970
PHOTOELECTRIC MEASURING APPARATUS HAVING
A PHOTOCELL ON A PERMANENT MAGNET
Filed April 2, 1945
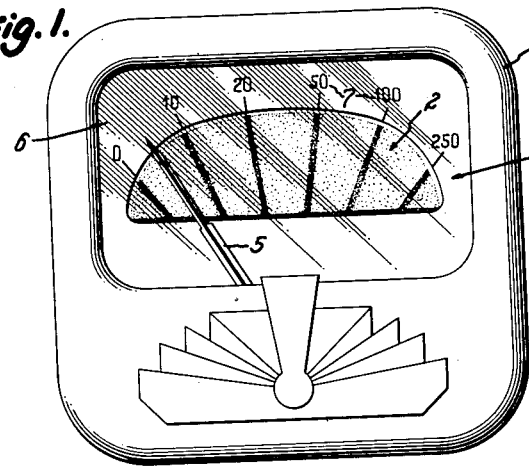
Fig. 1.
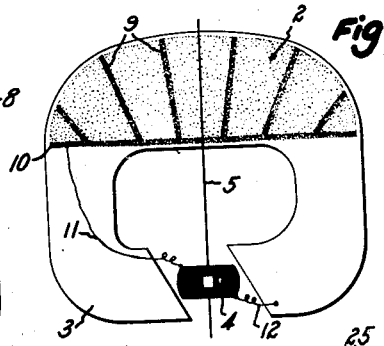
Fig. 2.
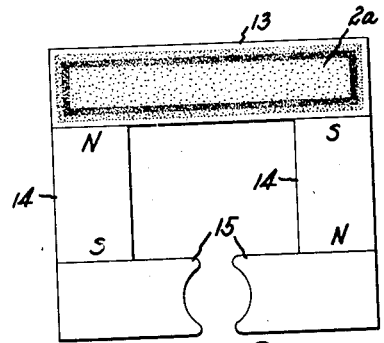
Fig. 3.
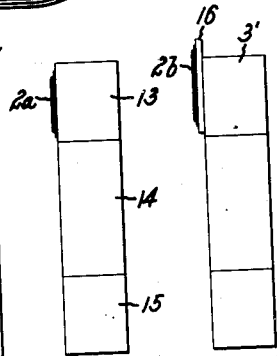
Fig. 4.  Fig. 5.
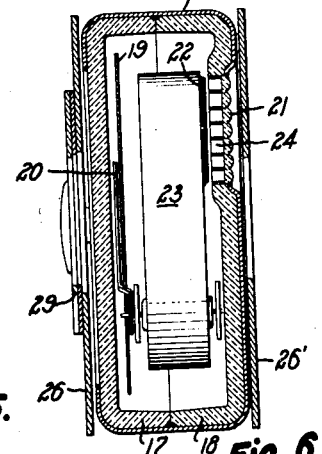
Fig. 6.
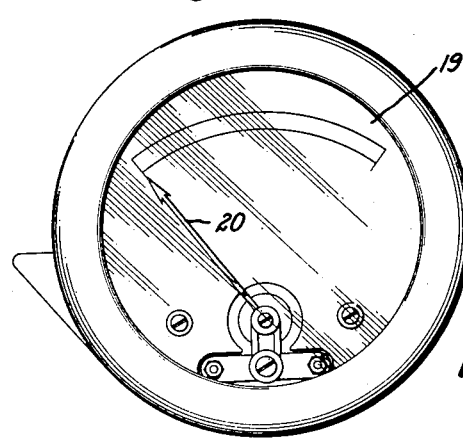
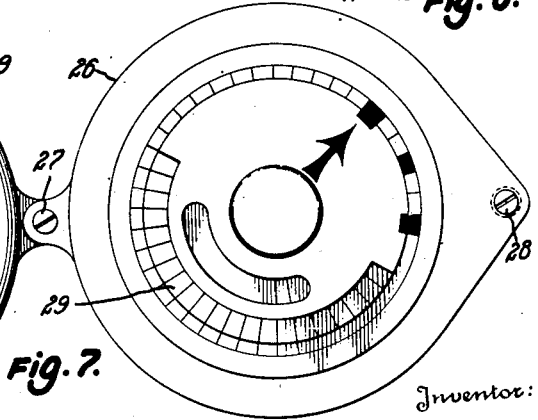
Fig. 7.
Inventor:
Anthony H. Lamb,
By Pierce + Scheffler,
Attorneys.

Patented Mar. 29, 1949

2,465,970

UNITED STATES PATENT OFFICE 2,465,970

PHOTOELECTRIC MEASURING APPARATUS HAVING A PHOTOCELL ON A PERMANENT MAGNET

Anthony H. Lamb, Hillside, N. J., assignor to Weston Electrical Instrument Corporation, Newark, N. J., a corporation of New Jersey Application April 2, 1945, Serial No. 586,181

8 Claims. (Cl. 88—23)

This invention relates to photoelectric measuring apparatus and particularly to measuring apparatus of the type including a current-generating selenium photocell and a sensitive direct current measuring instrument housed within the same casing.

Light meters and photographic exposure meters are typical photoelectric measuring devices that should be of as small size and light weight as is possible within the design requirements of sensitivity and stability. The selenium photocell comprises a layer of selenium on a back plate or base electrode of iron, and a transparent outer electrode layer upon the selenium. The photocell must be so spaced from the permanent magnet of the measuring instrument that the magnetic leakage through the iron base electrode of the photocell is not excessive, and this design requirement has resulted in relatively large and bulky photoelectric measuring instruments.

Objects of the present invention are to provide photoelectric measuring apparatus of smaller size and of more stable light sensitive characteristics than has been possible in the prior constructions. Objects of the invention are to provide photoelectric measuring apparatus in which the back electrode of the photocell is a part of the instrument and, preferably, is an essential part thereof, the photocell being formed directly upon the permanent magnet. Another object is to provide a combined photoelectric cell and permanent magnet of appropriate shape for incorporation in a sensitive measuring instrument.

These and other objects and advantages of the invention will be apparent from the following specification when taken with the accompanying drawings in which:

Fig. 1 is a front elevation of a light meter embodying the invention;

Fig. 2 is an elevation of the photocell-permanent magnet assembly, the moving system of the instrument being shown schematically in the air gap of the magnet;

Fig. 3 is a front elevation of a photocell-permanent magnet system in which short permanent magnets are assembled with soft iron sections to form the permanent magnet system;

Fig. 4 is a side elevation of the photocell-permanent magnet system of Fig. 3;

Fig. 5 is a side elevation of another form of photocell-permanent magnet system embodying the invention;

Fig. 6 is a sectional view through an exposure meter in which the photocell is formed directly on the permanent magnet; and Fig. 7 is an elevation of the exposure meter as seen with the cover turned back for use of the meter.

In Fig. 1, the reference numeral 1 identifies the casing that houses the selenium type photocell 2 and the milliammeter of a light meter, the milliammeter comprising a permanent magnet 3 and a moving coil 4, see Fig. 2, carrying a pointer 5. A portion 6 of the front wall of the casing 1 is transparent to admit light to the photocell and to permit a reading of the pointer 5 with respect to the scale graduations 7 that may be stamped in or printed on the inner face of the window portion 6 of a casing 1 formed of a transparent plastic, or that may be printed on a scale plate 8 of the conventional type. The scale plate, when one is incorporated in the instrument, is apertured to admit light to the photocell 2.

In accordance with this invention, the photocell 2 is made an integral part of the permanent magnet system of the measuring instrument, thereby eliminating the leakage of magnetic flux through the iron back plate of the conventional arrangements in which the photocell is spaced from the permanent magnet. The photocell 2 is preferably formed, as shown in Fig. 2, by depositing the selenium layer directly upon the permanent magnet 3 and, after conversion of the selenium to the active crystalline state, depositing the outer transparent electrode layer upon the selenium layer. The photocell may be of conventional design with a current collecting ring of soft metal sprayed along the periphery of the outer translucent electrode layer or, as illustrated in Figs. 1 and 2, the current collecting elements may be deposited through a stencil as ribs 9 extending radially of the axis of the moving coil 4 to form scale divisions that aline with the numerical scale graduations 7. The radial current collecting ribs merge into and are thereby electrically connected to a transverse rib 10 to which the lead 11 from one terminal of the coil 4 is connected by soldering or welding. The lead 12 to the other coil terminal is grounded on the magnet 3.

The term "permanent magnet" is used in the customary sense to designate the structure for establishing the magnetic field in which the coil 4 is pivotally mounted, and it is to be understood that it includes composite magnets as well as one-piece constructions of magnet steel. As shown in Figs. 3 and 4, the photocell 2a is formed on the iron yoke 13 of a composite permanent magnet including the short bar magnets 14, 14 secured between the yoke 13 and soft iron pole pieces 15, 15. Another embodiment, as shown in Fig. 5, includes a separately formed photocell 2b having a back electrode 16 secured to the magnet 3' by spot welding. This construction is slightly thicker than the previously described and preferred arrangements but it has the advantage that the size of the photocell is not limited to the space available on the magnet.

The photographic exposure meter illustrated in Figs. 6 and 7 has a casing formed by sections 17, 18 of a molded transparent plastic that are autogenously sealed at their junction, as described in my prior Patent No. 2,363,796, to form a substantially unitary casing. The scale plate 19 and instrument pointer 20 are exposed to view through the transparent casing section 17, and light is admitted through the transparent multiple lens wall section 21 of the casing section 18 to the photocell 22 that is formed directly on the permanent magnet structure 23 of the measuring instrument. A grid or mechanical baffle 24 may be provided at the rear of the multiple lens plate 21 to cooperate therewith to limit the angular spread of the light rays that reach the photocell 22. An opaque layer 25 of enamel or colored plastic is preferably applied to the portions of the casing sections 17, 18 that need not be transparent. The instrument may be, and preferably is, provided with a protective cover comprising metal or plastic material plates 26, 26' that are secured to the casing by a pivot pin 27 and connected to each other by a strut 28. A multiple disk calculator 29 for evaluating the measured scene brightness and other factors to obtain appropriate exposure data is mounted upon the cover plate 26 at the scale plate and pointer face of the exposure meter.

The measuring apparatus and combined photocell-magnet assemblies herein illustrated and described are typical of the invention but it is to be understood that the invention is not limited thereto as various modifications that may occur to those familiar with the design and construction of photocells and photoelectric measuring apparatus fall within the scope of the invention as set forth in the follow claims.

I claim:

1. A photoelectric measuring apparatus of the type including a current-generating photoelectric cell having a back electrode of ferrous material; and a measuring instrument including a permanent magnet having opposed poles spaced by an air gap and a coil pivotally mounted in said air gap characterized by the fact that said cell is located on one of the faces of said magnet and that such face constitutes the back electrode of said cell.

2. A photooelectric measuring apparatus comprising a casing, a measuring instrument within the casing and including a permanent magnet and a coil pivotally mounted in the air gap thereof, a pointer carried by said coil, said casing having a transparent window for viewing said pointer, and a photoelectric cell within the casing in the path of light rays entering said transparent window; said photocell comprising a layer of active material between a back electrode and an outer electrode, and current-collecting ribs overlying said outer electrode, said ribs extending radially of the pivotal axis of said coil and constituting scale divisions for the measuring instrument.

3. A photoelectric measuring apparatus as recited in claim 2 wherein the active material of said photocell is selenium, and said permanent magnet is the back electrode of said photocell.

4. A photoelectric measuring apparatus comprising a casing having transparent wall portions at opposite faces thereof, a measuring instrument having a permanent magnet and a coil pivotally mounted in the air gap thereof, a pointer carried by said coil and visible through one transparent wall portion of the casing, and a photoelectric cell of the current-generating type in the path of light entering the second transparent wall portion, the active material layer of said photocell being deposited directly upon one of the faces of said permanent magnet, the magnet constituting the back electrode of said photocell.

5. A photoelectric measuring apparatus as recited in claim 4, wherein said second transparent wall portion is a multiple lens system for limiting the angular spread of the light rays reaching said photocell.

6. A photoelectric measuring apparatus as recited in claim 4, wherein said casing is formed of a transparent plastic with opaque material limiting the passage of light therethrough to said transparent wall portions, and said second transparent wall is die-pressed to form a multiple lens plate.

7. In a magnet-photocell assembly for use in photoelectric measuring apparatus, a permanent magnet having juxtaposed poles to set up a magnetic flux in the air gap therebetween, a layer of light sensitive material in direct contact with a face of said magnet, and an outer electrode layer indirect contact with said light sensitive layer, said light sensitive and outer electrode layers and the magnet surface in contact with said light sensitive layer constituting a photocell of the current generating type.

8. A magnet-photocell assembly as defined in claim 7 wherein said permanent magnet is of approximately C-shape, and said outer electrode layer includes current collecting ribs thereon extending radially of the axis of the air gap between the magnet poles.

ANTHONY H. LAMB.

REFERENCES CITED

The following references are of record in the file of this patent:

UNITED STATES PATENTS

| Number | Name | Date |
| --- | --- | --- |
| 2,015,431 | McIlvaine | Sept. 24, 1935 |
| 2,046,665 | Weston | July 7, 1936 |
| 2,058,531 | Tuttle | Oct. 27, 1936 |
| 2,123,670 | Weston | July 12, 1938 |
| 2,222,425 | Wehe | Nov. 19, 1940 |
| 2,274,411 | Williams | Feb. 24, 1942 |
| 2,279,846 | Stapleton | Apr. 14, 1942 |
| 2,346,529 | Whittenton | Apr. 11, 1944 |

OTHER REFERENCES

"Photocells and their application," by Zworykin and Wilson, published in 1930 and 1934 by John Wiley, pages 151 and 152.

Certificate of Correction

March 29, 1949.

Patent No. 2,465,970.

ANTHONY H. LAMB

It is hereby certified that errors appear in the printed specification of the above numbered patent requiring correction as follows:

Column 3, line 61, claim 2, for "photooelectric" read *photoelectric*; column 4, line 39, claim 7, for "indirect" read *in direct*;

and that the said Letters Patent should be read with these corrections therein that the same may conform to the record of the case in the Patent Office.

Signed and sealed this 23rd day of August, A. D. 1949.

[SEAL]

THOMAS F. MURPHY,
*Assistant Commissioner of Patents.*